April 1, 1958 K. A. DOUTT 2,829,233
AUTOMATIC GAP CONTROL DEVICE FOR HYDRAULICALLY
ACTUATED FLASH WELDERS
Filed Aug. 23, 1956 3 Sheets-Sheet 2

INVENTOR.
Kingsley A. Doutt
BY
W. B. Harpman
ATTORNEY.

April 1, 1958     K. A. DOUTT     2,829,233
AUTOMATIC GAP CONTROL DEVICE FOR HYDRAULICALLY
ACTUATED FLASH WELDERS
Filed Aug. 23, 1956     3 Sheets-Sheet 3
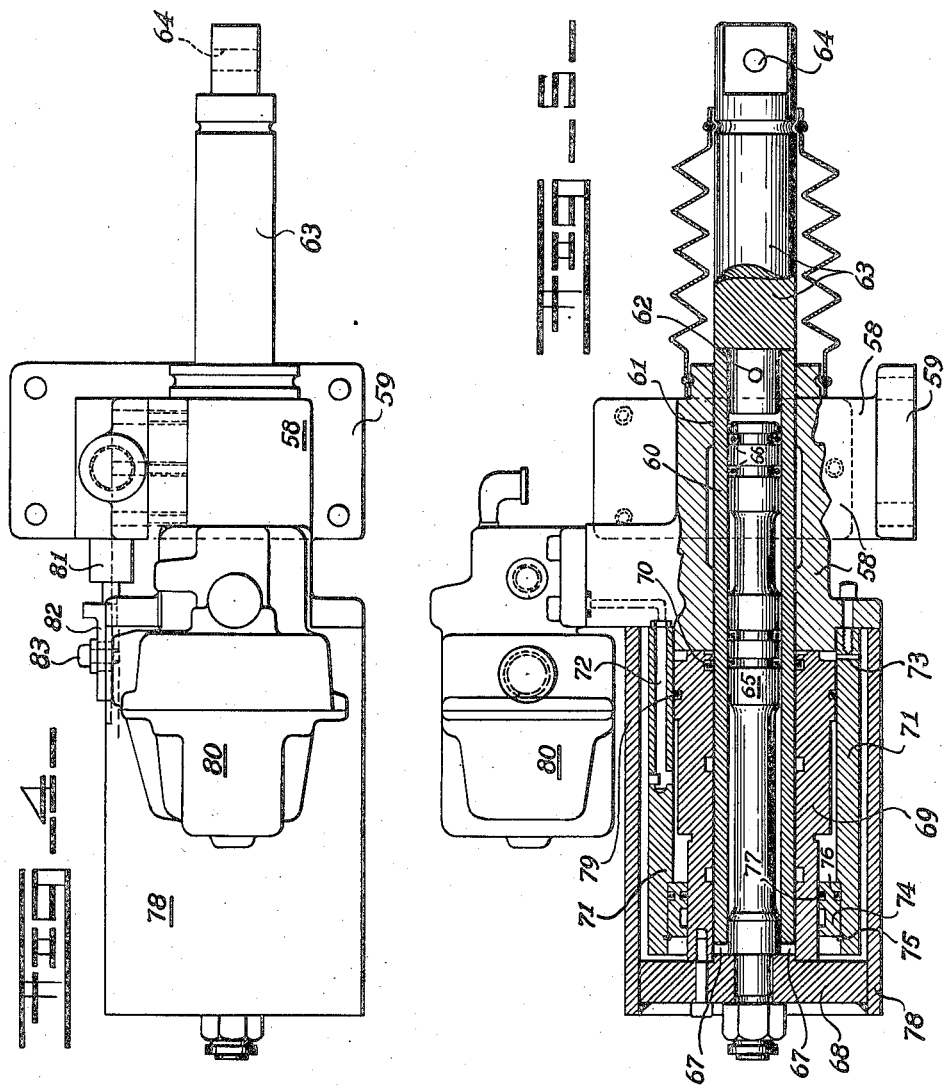
INVENTOR.
Kingsley A. Doutt
BY
W. B. Harpman
ATTORNEY.

United States Patent Office 2,829,233
Patented Apr. 1, 1958

2,829,233

AUTOMATIC GAP CONTROL DEVICE FOR HYDRAULICALLY ACTUATED FLASH WELDERS

Kingsley A. Doutt, Alpena, Mich.

Application August 23, 1956, Serial No. 605,729

7 Claims. (Cl. 219—97)

This invention relates to hydraulically operated flash welders in general and more particularly to an automatic device for controlling the gap between the workpieces therein and capable of providing the same type of preheating that is accomplished by hand.

The principal object of the invention is the provision of an automatic device for controlling the gap between the workpieces in a hydraulically operated flash welder that will bring the workpieces together under pressure, permit pulsation heating as by a timer actuated circuit, retract the workpieces a controlled distance and then advance the same to a point to provide a preselected gap and start an automatic flashing cycle.

A further object of the invention is the provision of a device for automatically preheating workpieces in a hydraulically operated flash welder regardless of the positioning of the workpieces in the welder with respect to one another, the device operating to always bring the workpieces together for preheating, retract the same and return them to a preselected gap suitable for an automatic flashing cycle. A still further object of the invention is the provision of a device for automatically controlling the gap between workpieces in a flash welder that permits the workpieces to be loaded in spaced relation or in abutting relation, and, upon being set with a desired gap, will automatically compensate for irregularities in the workpieces or the settings thereof in continuously establishing a proper gap between the workpieces for the starting of an automatic flash welding cycle.

A still further object of the invention is the provision of an automatic device for a hydraulically operated flash welder that will insure a positive gap control at all times and thereby insure the quality of the weld effected between the workpieces.

Those skilled in the art will be familiar with the practice heretofore necessary in welding workpieces with a flash welder and wherein the workpieces had to be brought together by hand operation to enable the same to be preheated by pulsations of current directed through the workpieces with the necessity of backing off the workpieces when suitably preheated and then manually returning them to a proper gap for the beginning of the automatic flashing cycle of the welding machine.

With the present invention positioned on an automatic flash welder and connected to the upset piston rod of the movable platen, the entire preheating operation and resetting for the beginning of the flashing operation may be automatically performed. More importantly, the initial adjustment of the machine establishing a desired flashing gap will be retained by the machine and always imparted to the successive workpieces in the flash welder thereafter regardless of the positioning of the workpieces in the clamps of the flash welder and regardless of their relative positioning with respect to one another.

In each instance of each welding of successive workpieces, the automatic gap control device disclosed herein, when used with a simple pneumatic time delay relay and a two-pole relay and pulsation timer, will operate to first present the workpieces together for preheating then retract the workpieces and bring them back to the initially determined gap whereupon the device will actuate the flash welder and commence the flashing cycle. The device thus permits the complete automatic flash welding of workpieces.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings wherein:

Figure 4 is a top plan view of a modified form of the invention.

Figure 5 is a side elevation of a modified form of the invention with parts broken away and parts in cross section.

Figure 1:
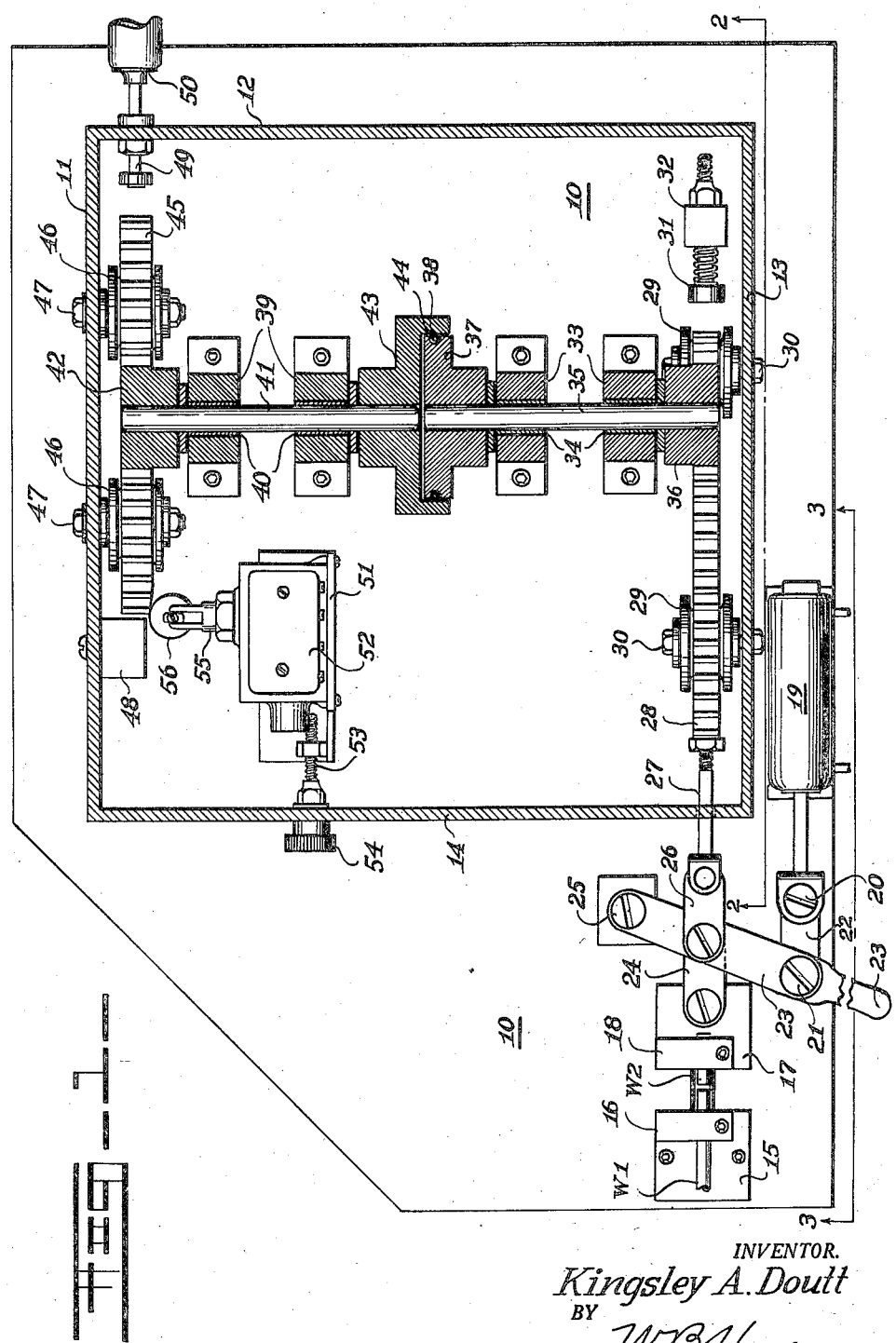
Figure 1 is a top plan view of the automatic gap control device.

By referring to the drawings and Figure 1 in particular it will be seen that the automatic gap control device includes a base 10 on which the various components thereof are mounted and has an enclosure thereon defined by vertically standing walls 11, 12, 13 and 14. The walls 11, 12, 13 and 14 may be extended upwardly above the uppermost portions of the device and may be provided with a top piece or closure (not shown) if desired, or, alternately, they may be dispensed with and the several portions of the device carried thereon may be mounted on brackets positioned on the base 10. The base 10 is, for example, an extension of a portion of an automatic flash welder.

As illustrated herein, the flash welder includes a fixed platen 15 having a work holding clamp 16 thereon and an adjacently positioned movable platen 17 having a work holding clamp 18 thereon.

Those skilled in the art will recognize that the movable platen with its work holding clamp 18 corresponds with the conventional movable platen of a conventional flash welder and is arranged for motion toward and away from the fixed platen 15 and its work holding clamp 16.

Figure 3:
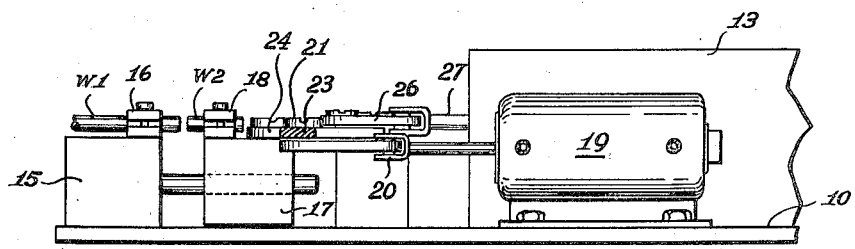
Figure 3 is a side elevation taken on line 3—3 of Figure 1.

In Figures 1 and 3 of the drawings two workpieces are illustrated, a workpiece W1 being secured in fixed relation to the fixed platen 15 by the clamp 16 and a workpiece W2 being secured in fixed relation to the movable platen 17 by its clamp 18. A hydraulic piston and cylinder 19 is intended to represent the hydraulic actuating means of the flash welding machine and is shown with the piston rod thereof connected by pivotal connections 20 and 21 with a link 22 and a lever 23 which in turn is pivotally connected by a link 24 with the movable platen 17.

It will be observed that one end of the lever 23 is pivotally secured as by a pivot 25 to the base 10 and that a secondary link 26 pivotally connects the lever 23 with an actuated arm 27 which extends through the vertical wall 14 and is attached to one end of a rack 28. The rack 28 is mounted for longitudinal travel in spaced parallel relation to the wall 13 by a plurality of sheaves 29—29 mounted on shafts 30—30 which are also secured to the vertical wall 13 and extend inwardly therefrom.

It will thus be seen that longitudinal travel of the movable platen 17 as it moves toward or away from the fixed platen 15 of the flash welder will impart similar longitudinal travel to the rack 28.

An adjustable spring tensioned stop 31 is mounted in spaced relation to the opposite end of the rack 28 by a supporting bracket 32 positioned on the base 10. A pair of support brackets 33 are also mounted on the base 10 and include journals 34 for a shaft 35 which is rotatably positioned therein. The shaft 35 has a pinion 36 on one end thereof engaged with the rack 28 and an annular disc 37 on the other end thereof which in turn is provided with an annular groove about its periphery in which a resilient O-ring 38 is positioned.

A pair of secondary support brackets 39 are also positioned on the base 10 and are provided with journals 40 in which a secondary shaft 41 is rotatably positioned in end-to-end alignment with the shaft 35. The secondary shaft 41 has a pinion 42 on one end thereof. The other end of the secondary shaft 41, which is adjacent the annular disc 37, carries a secondary annular disc 43 which is provided with an annular flange 44 overlying the periphery of the disc 37 and in closely spaced relation to the same so that the resilient O-ring 38 establishes frictional engagement therebetween. Thus, rotating motion imparted to the shaft 35 by longitudinal travel of the rack 28 will be transmitted to the secondary shaft 41 through the frictional engagement of the O-ring 38 between the parts 37 and 44, respectively.

A secondary rack 45 is positioned for longitudinal travel on a pair of sheaves 46—46 which are in turn positioned on shafts 47—47 which are secured to the side wall 11. The secondary rack 45 is thus positioned in spaced parallel relation to the rack 28 and is engaged by the pinion 42 and is thereby movable simultaneously with the rack 28.

A fixed stop 48 is attached to the side wall 11 in end-to-end alignment with the secondary rack 45 and a push rod 49 is positioned through the end wall 12 and connected with a piston rod of a pneumatic piston and cylinder assembly 50. The secondary rack 45 may thus be moved into engagement with the stop 48 by actuation of the piston and cylinder assembly 50 and the push rod 49. The pneumatic piston and cylinder assembly 50 may be double acting and thereby self-retracting or may alternately be spring loaded so as to move the push rod 49 away from the rack 45.

The base 10 supports and guides a slidable bracket 51 which is thereby movable longitudinally toward and away from the wall 14.

A multiple contact switch 52 such as a "Microswitch" is mounted on the bracket 51 and a screw threaded shaft 53 engages a portion of the bracket 51 and is rotatably mounted in an opening in the end wall 14 and provided with a knurled adjustment knob 54 on the outer side thereof. The knurled adjustment knob and the adjacent portion of the end wall 14 may have suitably calibrated indicia indicating the width of the gap between the workpieces W1 and W2 to be set by the machine.

It will be obvious to those skilled in the art that rotation of the knurled knob 54 will move the electrical switch 52 in spaced parallel relation with the secondary rack 45 so that a switch actuating arm 55, and more particularly a roller 56 carried on the outermost end thereof, will move into and out of engagement with a corner of the secondary rack 45 when the same is moved.

In operating a flash welder to which the device of the invention is attached, as hereinbefore disclosed, the workpieces W1 and W2 are clamped to the platens 15 and 17.

The extending handle-like portion of the lever 23 is used to move the movable platen 17 to the right, as shown in Figure 1 of the drawing, by which action the rack 28 is also moved to the right and against the stop 31.

The knurled knob 54 is rotated to align indicia thereon with the indicia on the end wall 14 indicating the desired gap between the workpieces W1 and W2, and the secondary piston and cylinder assembly 50 is momentarily energized to move the push rod 49 to the left and thereby push the secondary rack 45 longitudinally against the stop 48. This operation is performed while the lever 23 is held in position holding the rack 28 against the stop 31. The lever 23 is then moved to the left until the workpieces W1 and W2 touch, it being observed that such movement is not imparted to the secondary rack 45 due to this rack having already been engaged against the stop 48 and is thereby incapable of moving further to the left. Movement of the rack 28 to the left results in a slippage between the discs 37 and 43 which are frictionally engaged by the resilient O-ring 38, heretofore described.

It will be seen that when the secondary rack 45 has moved into engagement with the stop 48 it will have engaged the roller 56 on the actuating arm 55 of the switch 52 which, as previously noted, has already been set to the desired gap setting.

The hydraulic piston and cylinder assembly 19 is then energized to retract the lever 23 and the movable platen 17 and to actuate the automatic flash welder which then begins its normal cycle, the first action of the flash welder being to actuate the hydraulic piston and cylinder assembly 19 so as to move the lever 23 and the platen 17 to flashing position.

As this motion occurs, the secondary rack 45, which moved to the right when the lever 23 and the platen were retracted, advances to the left until it engages the roller 56 and actuates the switch 52. The switch 52 is connected to the flash welder and automatically actuates the flashing current controls so that flashing begins at the predetermined gap between the workpieces W1 and W2. The flash welder continues through its flashing cycle as known in the art.

At the conclusion of the actual welding of the workpieces W1 and W2 the platen 17 is retracted, the clamp opened and the workpieces removed.

Workpieces subsequently clamped in position will continue to be automatically moved to the proper predetermined gap by the mechanism by a repetition of the operation just described with the flashing operation starting each time the secondary rack 45 reaches and actuates the switch 52. This will occur regardless of the positioning of the workpieces W1 and W2 on the platens 15 and 17 due to the actuation of the piston and cylinder assembly 50 actuating the push rod 49 and moving the secondary rack 45 to the left against the stop 48 each time the platen 17 is moved to extreme right position.

It will occur to those skilled in the art that limit switches (not shown), as known in the art, will be actuated by the platen 17 to control the piston and cylinder 50 so as to move the secondary rack 45.

In summary, it will be seen that the automatic preheating and gap determining and controlling action of the device is occasioned by the relative positioning of the rack 28 and secondary rack 45 and the fact that movement to the right of the rack 28 will always impart comparable movement to the rack 45, while movement to the left of the rack 28 will not necessarily cause comparable movement of the secondary rack 45 when the same has been preset by advancing it to the left as by the push rod 49 and into engagement with the stop 48.

It will thus occur to those skilled in the art that the desired gap for the flashing operation is always uniformly obtained through the action of the device regardless of the positioning of the workpieces with respect to one another or their relative positioning to the fixed and movable platens 15 and 17.

It will further be seen that the size of the gap can be varied at will by simple adjustment of the switch 52 as provided by the device.

It will occur to those skilled in the art that modifications in the structure just disclosed may be made without departing from the basic principle of the invention and several different structures formed which include relatively movable means corresponding to the racks 28 and 45 of the example hereinbefore given while such structures may otherwise differ.

One such desirable modification is illustrated in Figures 4 and 5 and by referring thereto it will be seen that a substantially different embodiment of the invention is disclosed in that a body member 58 including a base 59 serves as a support for a cylindrical member 60 which is reciprocally mounted in a bore 61 transversely therethrough.

One end of the cylindrical member 60 is pinned at 62 to a follow-bar extension 63 which is connected at its outermost end by means of an aperture 64 therethrough to the upset cylinder or moving platen of a flash welder in the same manner, for example, as the rack 28 in the hereinbefore described embodiment of the invention was attached to the movable platen 17.

A spool 65 is reciprocally positioned within the cylindrical member 60 in frictional engagement therewith by means of a plurality of O-rings 66—66 positioned around the same and engaging the interior of said cylindrical member 60.

An end 67 of the spool 65, oppositely disposed with respect to the follow-bar 63, is secured to a cylinder head 68 which in turn is secured in one end of a reset cylinder 69 which in turn is provided with an O-ring 70 engaging the outer surface of the cylindrical member 60. The reset cylinder 69 is adapted to engage the body member 58 so as to form an air space therebetween into which air pressure may be introduced to move the reset cylinder and the attached cylinder head 68 to the right as shown in Figure 5 of the drawings. Such motion will result in a similar motion on the part of the spool 65 due to its attachment to the cylinder head 68.

The reset cylinder 69, in addition to being reciprocally mounted on the exterior of the cylindrical member 60, is mounted within a secondary cylindrical member 71 which comprises in effect an extension of the body member 58 and which serves to provide air passageways 72 and 73 through which air may be introduced into or exhausted from the respective ends of the reset cylinder 69, as hereinafter described.

The secondary cylindrical member 71 mounts an annular bushing 74 adjacent its outermost end which is that end normally lying adjacent the cylinder head 68, heretofore referred to, the annular bushing 74 being retained by a snap ring 75 and provided with internal and external O-rings 76 and 77, respectively, which seal it with respect to the secondary cylindrical member 71 and the reset cylinder 69, respectively.

The cylinder head 68 is provided with a sleeve 78 which forms a movable closure about the exterior of the secondary cylindrical member 71 and it is positioned thereabout in spaced relation thereto.

It will also be seen that the reset cylinder 69 is provided with an O-ring 79 to seal the exterior thereof with respect to the interior of the cylindrical member 71.

Still referring to Figure 5 of the drawings it will be seen that the air passageway 72 communicates with the area about the reset cylinder 69 at a point substantially midway between the ends thereof so that air pressure introduced into said area will always act to move the reset cylinder 69 into the position illustrated where it is bottomed against the body member 58.

It will be observed by those killed in the art that when the follow-bar extension 63, which is connected with the moving platen of the flash welder, is moved to the left, it will move the cylindrical member 60, spool 65 and the reset cylinder 69 to the left through the frictional contact of the O-rings 66—66 and 70.

In operation the reset cylinder 69 is held bottomed against the support member 58 by air pressure directed to it through the passageway 72 and under control of a normally open three-way air valve 80. Workpieces are clamped to the fixed and stationary platens as known in the art, the valve 80, which is a solenoid actuated valve, opened which moves to port the reset cylinder air pressure to exhaust.

A timer (not shown), or, alternately, a manual control, causes the movable platen to start return motion which continues until a limit switch 81 is engaged by a limit switch operator 82 (see Figure 4 of the drawings) which is secured to the sleeve 78 by a movable fastener 83. The limit switch 81, upon being released, is closed and the resulting action is used to control the flash welder, as known in the art, so as to stop the return motion of the platen and start the flashing cycle.

It will thus be seen that when the platen was moving forward to close the gap between the workpieces, the follow-bar extension 63 and the cylindrical member 60 move with it and slide over the O-rings 66. When the platen is moved in the return direction, the follow-bar extension 63 and the cylindrical member 60 imparted movement to the spool 65 because of the friction of the O-rings 66. As the cylinder head 68 and the reset cylinder 69 are attached to the spool 65, they also moved with the platen in return direction, and, as the limit switch operator 82 is mounted in the sleeve 78, the plunger of the limit switch is allowed to extend and its contacts closed causing the return motion of the platen to stop and the flashing cycle to start.

The flashing cycle of the flash welder moves the movable platen forward again, and because of the friction of the O-rings 66, the reset cylinder 69, cylinder head 68 and the spool 65 move with the cylindrical member 60 and the follow-bar extension 63 until the reset cylinder 69 bottoms on the support member 58.

As the platen continues through the weld cycle, the cylindrical member 60 once more slides over the spool 65. With the weld completed and the clamps released, the air valve 80 is de-energized directing air pressure to the area about the reset cylinder 69 which holds it in forward position. When the platen returns completing the weld cycle, the cylindrical member 60 once more slides over the spool 65 to its original position.

Those skilled in the art will observe that if the parts being welded require preheating, the action is the same as the operation just described except that the platen stays forward after the gap has been closed until a pulsation timer, as known in the art, which controls the preheating current through the contacting workpieces operates to preheat the same.

Figure 2:
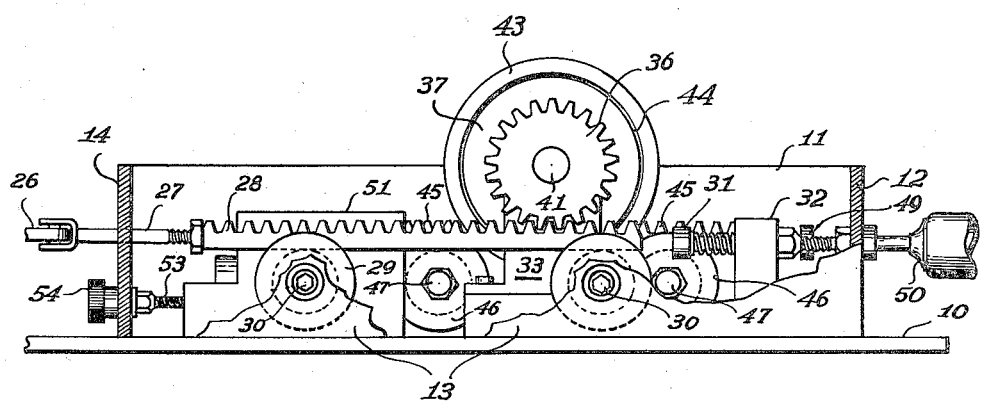
Figure 2 is a side elevation taken on line 2—2 of Figure 1.

It will thus be observed that the modification of Figures 5 and 6 of the drawings is essentially the same control and slippage motion device as that of the embodiment illustrated in Figures 1 through 3 of the drawings and the results obtained through the use of either form of the invention disclosed meet the several objects of the invention.

It will occur to those skilled in the art that a flash welder equipped with the device herein disclosed with the welder controls under the control of the switch 52 or 81 will perform a perfect flash welding operation on each pair of workpieces inserted therein and will continue to maintain the indicated and preset gap as long as desired. By incorporating a simple timer (not shown) with the device, the automatic preheating made possible by the actuation of the device becomes a part of the automatic operation so that the workpieces are first engaged, the preheating current cycled therethrough under control of the timer, and the actuation of the device in retracting the workpieces and then advancing them to predetermined flashing position is completely automatic thereby enabling the machine to be set up and actuated with a minimum of labor and at a maximum rate of production.

Having thus described my invention, what I claim is:
 1. A device for controlling the flashing current supply circuit of a flash welder to provide a preselected gap between the workpieces therein and comprising a member movable with one of said workpieces, a secondary mov- able member in frictional engagement with said first mentioned member for movement thereby, means for limiting the movement of said first mentioned member in one direction and secondary means for limiting the movement of the secondary movable member in the other direction, means for holding said first mentioned movable member against said movement limiting means and means for simultaneously moving said secondary movable member against said secondary movement limiting means therefor, a switch adjustably positioned with respect to said secondary movable means for actuation thereby and connected in said current supply circuit.

2. The device for controlling the flashing current supply circuit of a flash welder to provide a preselected gap between the workpieces therein as set forth in claim 1 and wherein said first mentioned movable member comprises a rack and said secondary movable member comprises a secondary rack in spaced parallel relation thereto, and wherein a pair of shafts in transverse end-to-end relation extend between said racks, and said shafts having pinions on their outer ends respectively engaged with said racks, discs on the inner adjacent ends of said shafts and resilient means disposed between said discs forming a friction drive therebetween.

3. A device for controlling the flashing current supply circuit of a flash welder having a fixed platen and a movable platen to provide a preselected gap between workpieces secured to said platens and comprising a movable member attached to said movable platen and a secondary movable member in frictional engagement with said first mentioned member and arranged for movement thereby, stop means limiting the movement of said first mentioned movable member in a direction away from said platen, secondary stop means arranged for limiting the movement of said secondary movable member in a direction toward said platen, switch means adjustably positioned adjacent said secondary stop means and said secondary movable member for actuation by said secondary movable member when the same moves toward said secondary stop means, means for moving said platen and said first mentioned movable member against said first mentioned stop means, and means for simultaneously moving said secondary movable member against said secondary stop means to establish a predetermined different degree of positioning between said first mentioned and secondary movable member, said switch means controlling said flashing current supply circuit of said flash welder.

4. The device for controlling the flashing current supply circuit of a flash welder to provide a preselected gap between workpieces therein as set forth in claim 1 and wherein said means for holding said first mentioned movable member against said movement limiting member comprises a lever, and wherein said means for moving said secondary movable member against said secondary movement limiting means comprises an air actuated device.

5. A device for controlling the flashing current supply circuit of a flash welder having a fixed platen and a movable platen and a hydraulically actuated device for moving the movable platen toward and away from the fixed platen, said device comprising a rack, links connecting said rack with said movable platen, and guide means mounting said movable rack for movement toward and away from said fixed platen, a secondary rack positioned in spaced parallel relation to said first mentioned rack and guide means mounting said secondary rack for movement parallel to said first mentioned rack, a pair of motion transmitting members one of which is engaged on said first mentioned rack and the other of which is engaged on said secondary rack, and a friction clutch interconnecting said motion transmitting members, means limiting movement of said secondary rack in one direction and an electrical switch adjustably mounted adjacent said motion limiting means for engagement and actuation by said secondary rack with the same is moved into proximity to said motion limiting means, independent means for moving said secondary rack into engagement with said motion limiting means when said movable platen is in widely spaced relation to said fixed platen, said switch connected in said current supply circuit.

6. The device for controlling the flashing current supply circuit of a flash welder to provide for a preselected gap between workpieces therein as set forth in claim 1 and wherein said first mentioned movable member comprises a cylindrical member and said secondary movable member comprises a spool reciprocally positioned therein and in frictional engagement therewith, and wherein a secondary cylindrical member is disposed about said cylindrical member and attached to and movable by said spool, said cylindrical member being mounted for reciprocal movement in a bore in a supporting bracket and said secondary cylindrical member adapted to engage said supporting bracket when moved in one direction by said spool and said cylindrical member.

7. A device for controlling a flash welder having a fixed platen and a movable platen to provide a preselected gap between workpieces secured to said platens and comprising a follow-bar extension attached to said movable platen and a cylindrical extension on said follow-bar extension, a spool reciprocally mounted in said cylindrical extension and means on said spool for frictionally engaging said cylindrical extension, a secondary cylinder reciprocally positioned over an end of said cylindrical extension, a cylinder head on said secondary cylinder secured to said spool, said cylindrical member mounted for reciprocal movement in a body member, a third cylindrical member mounted on said body member in spaced relation about said secondary cylindrical member, an annular gasket sealing the area between said secondary and third cylindrical members, and means for introducing fluid pressure into the areas between said secondary and third cylindrical members for holding said secondary cylindrical member in predetermined position whereby said spool is held against movement in said cylindrical member.

References Cited in the file of this patent

UNITED STATES PATENTS 2,650,275    Doutt    Aug. 25, 1953